Sept. 26, 1944.                H. C. MYERS ET AL                2,359,143
                                IGNITRON EXCITATION
                                Filed May 23, 1942
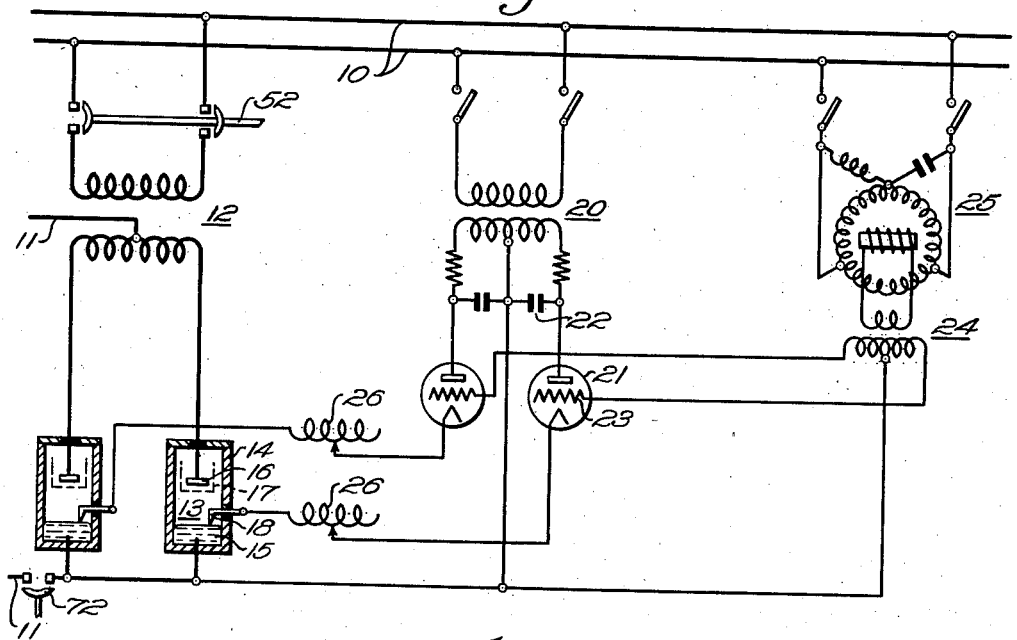
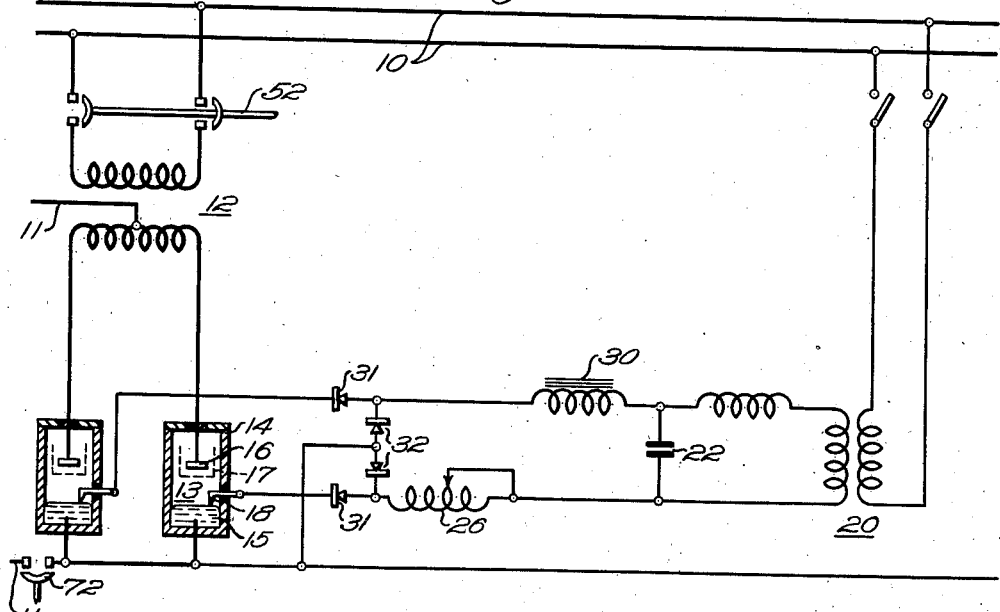
WITNESSES:                                              INVENTORS
                                                    Joseph H. Cox and
                                                    Henry C. Myers.
                                                  BY
                                                              ATTORNEY Patented Sept. 26, 1944

2,359,143

UNITED STATES PATENT OFFICE 2,359,143

IGNITRON EXCITATION

Henry C. Myers, Irwin, and Joseph H. Cox, Forest Hills, Pa., assignors to Westinghouse Electric & Manufacturing Company, East Pittsburgh, Pa., a corporation of Pennsylvania Application May 23, 1942, Serial No. 444,270

3 Claims. (Cl. 315—200)

Our invention relates to a vapor electric device and particularly to a control system for increasing the reliability of such a device.

In the operation of vapor-electric valves of the make-alive type, it has been found desirable to control the instant of cathode excitation by applying to the make-alive electrode a short impulse of make-alive current. The impulse must be sufficiently steep so that the excitation of the valve is within a small enough time interval to provide uniform operation of the several valves in a group. The current impulse can be applied in a variety of ways but the most satisfactory methods for commercial application have so far been the so-called tube firing circuits in which a potential source such as a capacitor, or capacitor reenforced transformer is discharged through a controlled valve to apply a steep fronted impulse to the make-alive electrodes, or the so-called reactor firing circuits in which a saturable reactor suddenly saturates to change the impedance of an alternating current circuit. Both these well known circuits apply an impulse having a steep wave front and usually persisting for a very short time interval. A typical installation produces an impulse having a wave front rising from zero to fifty amperes in a time of the order of fifty microseconds.

These circuits have many very desirable advantages but for some as yet unknown reason, it has been found that in commercial service, particularly continuous service, the application of such steep wave fronts has a deleterious effect on the make-alive electrodes in that they become coated with liquid mercury, mercury solutions, amalgams or compounds, (usually called wetting) after which the power required to produce cathode excitation is materially increased.

Also, when the impulses are of too short duration, the make-alive electrode may not always act, resulting in misfire.

In either event, the cure has been the use of a great deal more power in the control circuit than is necessary under favorable conditions and a consequent reduction in efficiency of the converter and usually an increase in cost of the control equipment.

We have found that the tendency to "wet" the make-alives as well as the random tendency to misfire can be greatly reduced by the use of an auxiliary or "sloping" reactor in the firing circuits to modify the shape of the wave front and duration of the impulse without the use of additional control energy or even with reduced energy.

It is, therefore, an object of our invention to provide means for increasing the reliability of operation of a vapor electric valve of the make-alive type.

It is a further object of our invention to provide an auxiliary "sloping" reactor to modify the wave shape of the control impulse.

It is a further object of our invention to provide a control impulse which tends to prevent misfire in a make-alive type valve.

It is a further object of our invention to provide a control system which tends to eliminate wetting of the make-alive electrode.

Other objects and advantages of our invention will be apparent from the following detailed description taken in conjunction with the accompanying drawing, in which:

Figure 1 is a schematic illustration of a vapor electric system utilizing our device, and Fig. 2 is a similar illustration of a modification according to our invention.

In the illustrative embodiment, according to Fig. 1, an alternating current circuit 10 is connected through a circuit breaker 52 to a direct current circuit 11 by means of a transformer 12 and the flow of current between the circuits 10 and 11 controlled by means of a plurality of make-alive type vapor electric valves 13. Each of the valves 13 comprises an evacuated container 14 enclosing a cathode 15 of vaporizable reconstructing material such as mercury, a cooperating anode 16 preferably constructed of graphite and usually surrounded by a deionizing shield 17. Excitation of the cathode is secured by means of a make-alive electrode 18 in contact with the cathode material during normal operation of the device. In practice a direct current breaker 72 is usually inserted in a direct current line 11.

For simplicity of illustration, the system is shown as so-called single phase but it is to be understood that in the majority of installations, the alternating current circuit 10 is polyphase and the valves 13 and control multiplied accordingly.

The impulsing circuit of this embodiment is shown as of the tube firing variety in which a source of alternating current of the desired frequency such as the transformer 20 is applied to the make-alive electrode 18 by means of a grid controlled valve 21. If desired capacitors 22 may be utilized to reduce the energy consumed from the source 20. The valves 21 have grids 23 energized from a suitable source such as the transformer 24 usually provided with phase shifting means such as the rotary phase shifter 25. A sloping reactor 26 is provided between the valve 21 and the make-alive electrode 18 to modify the wave shape of the impulse released by the valve 21.

In the operation of this embodiment of our invention, the valve 21 releases the impulse at or near the peak of the alternating wave of potential produced by transformer 20 and the resulting wave front is quite steep, a typical wave producing a current of fifty (50) amperes in a time of the order of fifty (50) microseconds. We have found that a sloping reactor 26 having a reactance of .8 to 5 millihenries will reduce the steepness of the front of the applied impulse such that the wave will rise to a value of the order of 15 amperes in a time of the order of 300 microseconds. The resultant impulse substantially eliminates the random misfire and for some not fully understood reason also substantially eliminates the wetting of the make-alive electrode 18.

In the embodiment according to Fig. 2, the impulsing system is of the wave distorter or so-called "reactor firing" type in which a saturable reactor 30 suddenly saturates and permits a momentary heavy current impulse to flow to the make-alive electrode 18. In general each wave distorter circuit will control two alternately conducting valves 13 with the polarity determined by means of the unilateral conducting devices 31 and 32. The sloping reactor 26 is connected in series circuit relation and not only slopes the front of the impulse wave but also extends the tail of the impulse so that in effect the time of make-alive current application is extended for a materially longer interval. Experience has shown that very desirable results were achieved with an impulse having a base of 20 electrical degrees.

While for purposes of illustration, we have shown and described specific embodiments of our invention, it is apparent that changes and modifications can be made therein without departing from the true spirit of our invention or the scope of the appended claims.

We claim as our invention:

1. An electric current conversion system for transferring electric energy between an alternating current circuit and a direct current circuit comprising a plurality of electric valves of the make-alive type for controlling the flow of current between said circuits, each of said valves including an anode, a vaporizable cathode spaced from said anode and a make-alive electrode for exciting said cathode, a source of exciting potential, an impulsing system connected between said source and said make-alive electrodes, said impulsing system for producing periodic impulses of steep wave front and a sloping reactor connected in series circuit relation between said impulsing system and each of said make-alive electrodes for modifying the wave shape of said impulses.

2. An electric current conversion system for transferring electric energy between an alternating current circuit and a direct current circuit comprising a plurality of electric valves of the make-alive type for controlling the flow of current between said circuits, each of said valves including an anode, a vaporizable cathode spaced from said anode and a make-alive electrode for exciting said cathode, a source of exciting potential, an impulsing system connected between said source and said make-alive electrodes, said impulsing system for producing periodic impulses of steep wave front and a sloping reactor connected in series circuit relation between said impulsing system and each of said make-alive electrodes for modifying the wave shape of said impulses, said sloping reactor having a reactance of the order of .8 to 5 millihenries.

3. A control system for a vapor electric valve having a main anode and cathode comprising a make-alive electrode in said valve, a source of periodic exciting current, an impulsing device energized from said source for producing periodic impulses of a steep wave front and short duration, circuit means for impressing said impulses on the make-alive electrode and auxiliary reactor means in series circuit relation with said make-alive electrode for modifying the wave shape of said impulses, said reactor means having an inductance of the order of .8 to 5 millihenries.

HENRY C. MYERS.
JOSEPH H. COX.